June 23, 1970     T. L. SHERBERT ET AL     3,516,710

FOLD-DOWN BACKREST AND PASSENGER VEHICLE IMPROVEMENTS

Original Filed July 20, 1967

INVENTORS
THOMAS L. SHERBERT
TILLISON M. SHERBERT

BY *Browne, Schuyler & Beveridge*

ATTORNEYS 3,516,710
Patented June 23, 1970

1

3,516,710
FOLD-DOWN BACKREST AND PASSENGER VEHICLE IMPROVEMENTS
Thomas Leroy Sherbert, Lanham, Md., and Tillison Myron Sherbert, Washington, D.C., assignors to D.C. Transit System, Inc., District of Columbia, a corporation of the District of Columbia
Original application July 20, 1967, Ser. No. 654,865, now Patent No. 3,455,597, dated July 15, 1969. Divided and this application Apr. 4, 1969, Ser. No. 813,462
Int. Cl. A47c *3/00*
U.S. Cl. 297—379    4 Claims

ABSTRACT OF THE DISCLOSURE

In a passenger vehicle such as a bus having a door in the rear wall thereof for bringing large packages or other articles into the bus, a passenger seat in the rear of the bus adjacent the door having a foldable backrest for providing a platform on which to rest the articles. The backrest includes opposite side members pivoted to adjacent portions of the associated seat frame, and locking pins movable into and out of recesses in the adjacent seat frame portions for locking the backrest in an upright position and for releasing the backrest for movement into a horizontal, article-receiving position.

RELATED PATENT APPLICATIONS

This application is a division of our copending U.S. patent application, Ser. No. 654,865 filed July 20, 1967, and entitled Passenger Vehicles, now U.S. Pat. No. 3,455,597.

SUMMARY OF OBJECTS

This invention relates to a novel fold-down backrest on a seat or chair and also to improvements in passenger vehicles such as buses incorporating the fold-down backrest. It should be understood however that the novel backrest of the present invention although disclosed in conjunction with a passenger vehicle may have utility in other environments and therefore need not be restricted to the specific environment disclosed.

One of the objects of the present invention is to provide in a passenger vehicle such as a bus, provision for resting large packages or parcels without blocking the aisle in the bus or disturbing its occupants. More specifically it is an object to utilize the backrest of one or more of the seats in the bus such that it may be folded into a horizontal position to provide a support surface for parcels, packages or other items.

A further object of the present invention is to provide a novel fold-down backrest for a chair or seat, which backrest is movable between an erect position for normal use and a horizontal retracted position. Included herein is the provision of such a backrest incorporating a novel locking mechanism for locking the backrest in its upright or horizontal positions.

A further object of the present invention is to provide such a backrest which may be incorporated into conventional seats in buses or the like.

SUMMARY OF THE INVENTION

According to one aspect of the present invention, the rear wall of a passenger vehicle such as a bus is provided with a large entrance door for admitting large parcels or other articles into the bus. Once brought into the bus, the packages may be rested on a platform formed by a folded-down backrest of one or more seats in the bus so that the packages are out of the path of travel through the bus and removed from contact with the bus occupants. Preferably, the fold-down backrests are provided on the seats in the rear of the bus adjacent the rear door. This feature is effected by mounting the backrest of one or more of the seats for movement between a normal upright position and a retracted generally horizontal position overlying the associated seat portion.

In one commercial embodiment, the backrest is made movable as aforedescribed by means of tubular coupling members interconnecting the opposite side portions of the backrest frame with the adjacent portions of the associated seat frame. These coupling members have slots which receive pivots on the backrest frame to pivotally mount the latter between the mentioned positions. To lock the backrest in upright position, the couplings have second slots which receive locking pins fixed on the backrest frame portions. To move the backrest into the retracted position, the backrest frame must first be pulled upwardly to disengage the locking pins from their slots whereupon the backrest may be easily pivoted downwardly into the horizontal position.

Other objects and advantages will become apparent in the following more detailed description in conjunction with the attached drawings in which.

DETAILED DESCRIPTION

Figure 2:
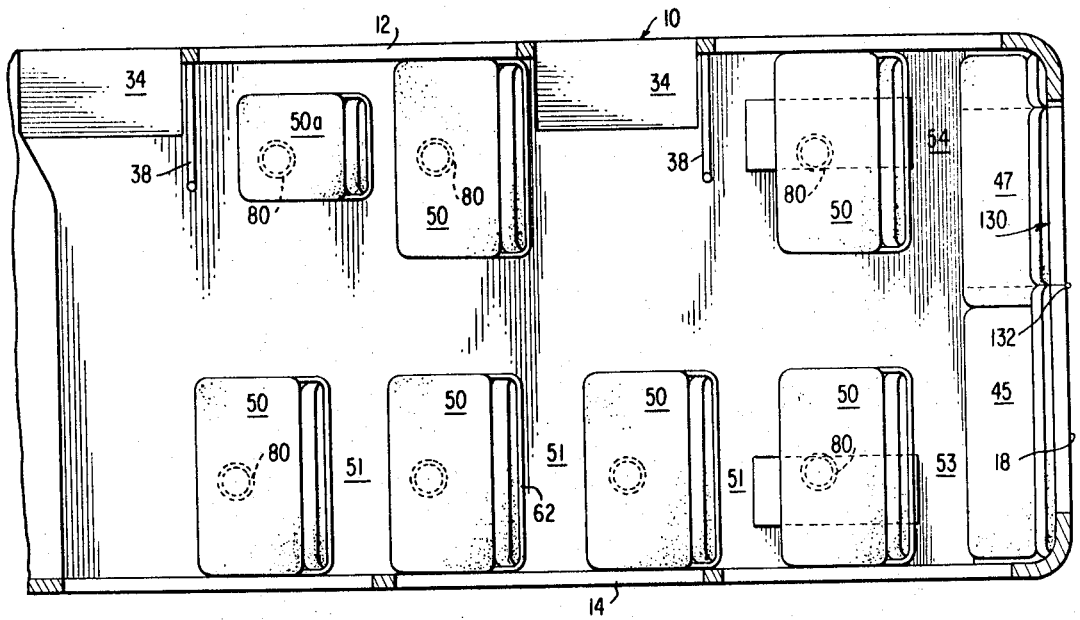
FIG. 2 is a fragmental, plan view of the bus with the front portion thereof broken away.

Referring now to the drawings in detail, there is shown for purposes of illustration only, a bus generally designated 10 incorporating the fold down backrest and other improvements of the present invention. Bus 10 has a generally rectangular body and typically includes opposite side walls 12 and 14 extending longitudinally of the bus and an opposite front wall (not shown) and rear wall 18 extending transversely between the side walls. Passenger entrance into the bus is through a conventional folding door 30 in the right front side of the bus while exit is through a similar folding door 32 provided also in the right-hand side but towards the rear of the bus. One or more steps 34 extend downwardly from the floor of the bus at side doors 30, 32. As shown in FIG. 2, hand rails 38 are situated on the right-hand side of doors 30, 32. Side walls 12, 14 may have any suitable or conventional constructions such as includes a lower nontransparent portion 42 formed from appropriate material and an upper portion formed by glass window panels 44 slidable in U-shaped panels attached in side walls 12, 14 to receive the upper and lower longitudinally extending edges of the window panels. Although not shown, the bus may have any suitable roof.

Figure 1:
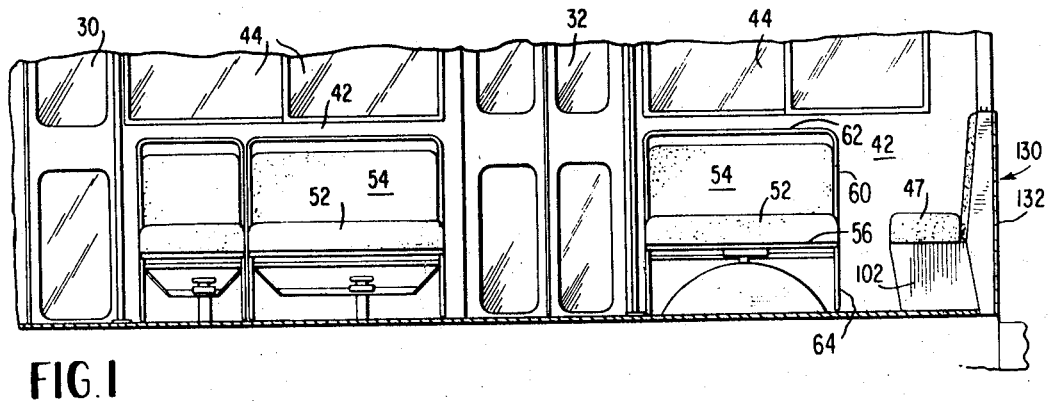
FIG. 1 is a fragmental, longitudinal cross sectional view of a bus incorporating the present invention and showing the right hand side interior position of the bus.

Passenger seats 50 in the bus are mounted to be adjustable between a position facing transversely of the bus as shown in FIG. 1 and a position facing longitudinally and forwardly of the bus as shown in FIG. 2. Seats 50 are dimensioned and arranged so that when in the position for example shown in FIG. 2 facing forwardly of the bus, sufficient leg room designated 51 is provided between adjacent seats. In the transversely facing positions such as indicated in FIG. 1, seats 50 may be placed with their adjacent ends in abutting engagement to form an effective substantially continuous seating surface along the side of the bus. Sufficient space designated 53 is also provided between the rearmost seats 50 and back seats 45, 47 which extend transversely between sides 12 and 14.

Back seats 45, 47 in the shown embodiment are not made adjustable in the same sense as seats 50. Additionally, in the specific embodiment shown, because of the interruption by side doors 30, 32, seats 50 on that side of the bus do not extend continuously in the same manner as the seats on the opposite side. Moreover one of the seats 50a is reduced in size in order to be accommodated in the space between side doors 30, 32. Adjustability of the seats 50 is achieved through a mounting mechanism 80 which is disclosed and claimed in our above identified copending application, Ser. No. 654,865 the disclosure of which is hereby incorporated by reference into this application where necessary.

Seats 50 each include a cushion seat portion 52 and a backrest portion 54 normally projecting upwardly in generally upright position. Cushion seat 50 is removably supported in a rectangular frame formed by tubular elements including opposite side and end elements 56 and 58. Backrest 54 is supported on a generally U-shaped frame formed by tubular elements including opposite and parallel side elements 60 interconnected at upper ends by cross elements 62 which also form hand rails. Support legs for the seats are provided by tubular members 64 which extend downwardly from the opposite ends of the seat cushion frame to engage the floor of the bus.

In order to permit entry of large packages, parcels or other items into the bus from the rear thereof to avoid interference and congestion at the entrance door 30 or in the aisle, rear wall 18 is provided with a door generally designated 130. Preferably, and as shown, door 130 is offset towards the right-hand side of the bus, the door being suitably hinged at 132 for swinging movement clockwise between a closed position indicated in FIG. 2 and an open position wherein it engages the exterior surface of the rear wall 18 with the free edge of the door spaced inwardly from the left-hand side of the bus. Before door 130 is opened, the rear seat 47 must be removed from its support ledges 102 which straddle the opposite sides of the rear doorway into the bus. In addition rear window panels which are slidable over the rear door 130 must be slid laterally to the left hand side of the bus before the door may be opened. For a more detailed description of the rear door 130 and the associated window panels, reference is hereby made to our other divisional patent application filed concurrently herewith and entitled Fold-Down Backrest and Passenger Vehicle Improvements and also to the aforementioned parent application, Ser. No. 654,865.

Figure 3:
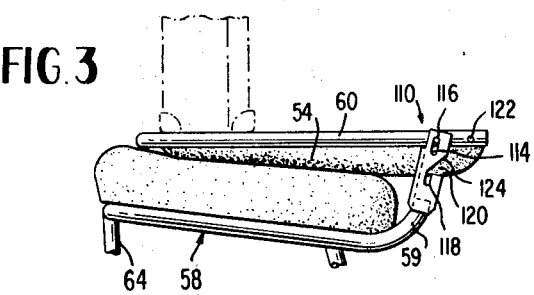
FIG. 3 is a fragmental, side view showing one of the seats in the bus with its backrest in retracted position for supporting packages illustrated in phantom.

In accordance with the present invention, one or more of the backrests 54 of seats 50 is made to be foldable from a normal, upright position into a retracted position overlying its associated cushion seat portion 52 in a generally horizontal plane as illustrated in FIG. 3. This position of the backrest may be employed to rest packages, articles, luggage and other items clear of the aisle in the bus and out of contact with the occupants. Although, if desired, all the seats 50 may be provided with the foldable backrest, it is preferred that at least the rear seats 50 adjacent the door 130 be provided with the foldable backrest.

Figure 3A:
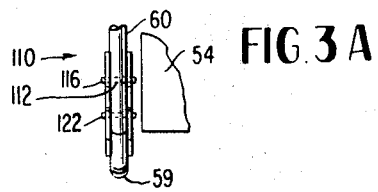
FIG. 3a is a side view of a coupling member shown in FIG. 3.

In the specific embodiment shown, this feature is provided by forming the backrest frame 60, 62 separate from the seat frame 58, and coupling these frame portions together by a pair of coupling members generally designated 110. Each coupling member 110 may have a generally U-shaped body as shown, or a tubular body, defining an elongated axial passage, one end of which receives the upwardly extending seat frame portion 59 to which the coupling member is suitably rigidly fixed in coaxial relation. As shown in FIG. 3a coupling member 110 has an elongated opening 112 extending longitudinally in its wall. In addition, as shown in FIG. 3, each coupling member has a first pair of elongated slots 114 aligned in diametrically opposite portions of the coupling wall on opposite sides of opening 112. Pivot pins 116 fixed to frame element 60 of the backrest are received through slots 114 to mount the backrest for pivotable movement between upright and retracted positions. In moving into and out of its opposite positions, the lower portion of the backrest frame 60 passes through opening 112 in the coupling member.

To releasably lock the backrest in the normal upright position against inadvertent movement, each coupling member is provided with a second pair of elongated slots 118 aligned below the first pair of slots 114. A wall portion of the coupling member is cut away to form recesses 120 communicating slots 118 with opening 112 in the side wall. Locking pins 112 are fixed on the backrest frame element 60 to be received first in recess in 120 and then into slots 118 upon movement of the backrest into upright position. Movement of backrest frame element 60 downwardly to seat locking pins 120 in slots 118 is facilitated by cam surfaces 124 formed in the coupling member along recesses 120. Upon pivoting the backrest into upright position, locking pins 122 will engage the cam surfaces and thereby will be cammed downwardly into slots 118. The backrest is thus located against pivoting because of the engagement between locking pins 122 and the edges of the coupling members defining slots 118.

To release the backrest for movement into retracted position, it is necessary to merely pull the backrest upwardly to remove locking pins 112 from slots 118 and place them in recesses 120 whereupon the backrest may be easily pivoted about its pins 116 into the horizontal position as shown in FIG. 3. One or more articles such as indicated by the dotted lines in FIG. 3 may then be supported on the backrest. Though only one coupling member has been described in detail above, it will be understood that two coupling members are employed on the opposite sides of each backrest frame in the specific embodiment.

What is claimed is:

1. A seat or the like including a base frame, a horizontal seat portion supported on the base frame, backrest including opposite frame elements extending on opposite sides thereof and terminating adjacent opposite portions of said base frame, means mounting the backrest for movement between a normal generally upright position and a retracted position generally overlying said horizontal seat portion, said means including a pivot pin fixed on one of said backrest frame elements and an elongated slot on the adjacent portion of said base frame receiving said pin for pivotal movement and a locking means for releasably retaining said backrest in the normal upright position against inadvertent movement, said locking means including a locking pin on said one backrest frame element spaced below said pivot pin, a second elongated slot formed on said adjacent base frame portion below said first slot for receiving said locking pin upon movement of said backrest into the upright position, and cam means for engaging and camming said locking pin into said second elongated slot upon movement of said backrest into the upright position.

2. The structure defined in claim 1 wherein said second slot is positioned and dimensioned to receive the locking pin upon rectilinear movement of said one backrest frame element relative to the adjacent base frame portion when the backrest is in the upright position.

3. The seat defined in claim 2 wherein said second slot includes a first portion extending generally in the direction of said one backrest frame element when in the upright position and a second portion laterally extending from said first portion and opening into the exterior of said adjacent base frame portion, said second portion of said second elongated slot being defined in part by said cam means.

4. A seat or the like including a base frame, a horizontal seat portion supported on the base frame, backrest including opposite frame elements extending on opposite sides thereof and terminating adjacent opposite portions of said base frame, means mounting the backrest for movement between a normal generally upright position and a retracted position generally overlying said horizontal seat portion, said means including a pivot pin fixed on one of said backrest frame elements and an elongated slot on the adjacent portion of said base frame receiving said pin for pivotal movement and a locking means for releasably retaining said backrest in the normal upright position against inadvertent movement, said locking means including a locking pin on said one backrest frame element spaced below said pivot pin, a second elongated slot formed on said adjacent base frame portion below said first slot for receiving said locking pin upon movement of said backrest into the upright position, said second slot being positioned and dimensioned to receive the locking pin upon rectilinear movement of said one backrest frame element relative to the adjacent base frame portion when the backrest is in the upright position, said second slot including a first portion extending generally in the direction of said one backrest frame element and a second portion extending laterally from said first portion and opening into the exterior of said adjacent base frame portion, said adjacent base frame portion including a hollow generally tubular coupling member having an elongated opening in its wall for receiving said one backrest frame element when the backrest is moved to upright position, said first slot being formed longitudinally in the wall of said tubular coupling members and said second slot being formed longitudinally in the wall of said tubular coupling member below said first slot.

References Cited

UNITED STATES PATENTS

| | | | |
|---|---|---|---|
| 1,681,979 | 8/1928 | Graham | 297—357 |
| 2,916,325 | 12/1959 | Estes et al. | 296—66 |
| 3,114,570 | 12/1963 | Farrow | 296—66 |

FOREIGN PATENTS

| | | |
|---|---|---|
| 660,989 | 2/1929 | France. |

BENJAMIN HERSH, Primary Examiner

J. A. PEKAR, Assistant Examiner

U.S. Cl. X.R.

297—357